United States Patent
Taragin et al.

(10) Patent No.: US 9,727,322 B2
(45) Date of Patent: Aug. 8, 2017

(54) METHODS, APPARATUS, AND ARTICLES OF MANUFACTURE TO DEPLOY SOFTWARE APPLICATIONS

(75) Inventors: Yonatan Taragin, Bei Shemesh (IL); Avigail Oron, Petah Tikva (IL)

(73) Assignee: ENTIT SOFTWARE LLC, Sunnyvale, CA (US)

(*) Notice: Subject to any disclaimer, the term of this patent is extended or adjusted under 35 U.S.C. 154(b) by 122 days.

(21) Appl. No.: 13/698,431

(22) PCT Filed: Jun. 1, 2010

(86) PCT No.: PCT/US2010/036971
§ 371 (c)(1),
(2), (4) Date: Nov. 16, 2012

(87) PCT Pub. No.: WO2011/152822
PCT Pub. Date: Dec. 8, 2011

(65) Prior Publication Data
US 2013/0067461 A1    Mar. 14, 2013

(51) Int. Cl.
*G06F 9/50* (2006.01)
*G06F 9/445* (2006.01)
(Continued)

(52) U.S. Cl.
CPC ............. *G06F 8/61* (2013.01); *G06F 9/505* (2013.01); *G06F 9/5044* (2013.01);
(Continued)

(58) Field of Classification Search
None
See application file for complete search history.

(56) References Cited

U.S. PATENT DOCUMENTS 5,761,380 A * 6/1998 Lewis .................. G06F 8/64
706/45
5,848,270 A   12/1998 DeLuca et al.
(Continued)

FOREIGN PATENT DOCUMENTS

CN    1662901    8/2005
CN    101334741  12/2008
(Continued)

OTHER PUBLICATIONS

Business Service Management, published by Wikipedia, http://en.wikipedia.org/wiki/Business_Service_Management, retrieved on Jan. 20, 2010, 1 page.
(Continued)

*Primary Examiner* — Brian W Wathen
(74) *Attorney, Agent, or Firm* — Mannava & Kang, P.C.

(57) ABSTRACT

Methods, apparatus, and articles of manufacture to deploy software applications are disclosed. A disclosed example includes query a user for a first parameter indicative of a capacity level needed for a software system and a second parameter indicative of a set of software applications to be installed for the software system, determine a group of components of the software system to be installed on the computer system based on the first parameter and the second parameter, determine a computer hardware requirement based on the set of software applications, compare the determined computer hardware requirement to a computer hardware configuration, indicate that the computer hardware configuration is sufficient when the computer hardware configuration at least meets the determined computer hardware requirement, and when the computer hardware configuration is sufficient, configure the set of software applications by installing the determined group of components of the set of software applications.

9 Claims, 8 Drawing Sheets

(51) Int. Cl.
*G06F 11/32* (2006.01)
*G06F 11/34* (2006.01)

(52) U.S. Cl.
CPC ........ *G06F 11/3442* (2013.01); *G06F 9/5072* (2013.01); *G06F 11/328* (2013.01); *G06F 11/3409* (2013.01); *G06F 11/3447* (2013.01); *G06F 2201/865* (2013.01)

(56) References Cited

U.S. PATENT DOCUMENTS

| | | | |
|---|---|---|---|
| 6,263,382 B1 | 7/2001 | Bartlett et al. | |
| 6,405,309 B1* | 6/2002 | Cheng | G06F 9/4401 713/1 |
| 6,768,901 B1 | 7/2004 | Osborn et al. | |
| 6,789,215 B1* | 9/2004 | Rupp et al. | 714/38.14 |
| 7,065,637 B1 | 6/2006 | Nanja | |
| 7,251,812 B1* | 7/2007 | Jhanwar | G06F 8/65 713/100 |
| 7,386,698 B2 | 6/2008 | Gimpl et al. | |
| 7,793,284 B2* | 9/2010 | Mason | G06F 8/61 709/220 |
| 2003/0225563 A1 | 12/2003 | Gonos | |
| 2005/0144070 A1 | 6/2005 | Cheshire | |
| 2005/0193389 A1* | 9/2005 | Murphy | G06F 8/61 717/175 |
| 2006/0174238 A1* | 8/2006 | Henseler | G06F 8/63 717/168 |
| 2006/0218278 A1* | 9/2006 | Uyama | G06Q 10/04 709/226 |
| 2006/0253472 A1 | 11/2006 | Wasserman et al. | |
| 2007/0038733 A1 | 2/2007 | Kothari et al. | |
| 2007/0169109 A1 | 7/2007 | Neswal | |
| 2007/0220509 A1 | 9/2007 | Shwartz et al. | |
| 2008/0059782 A1 | 3/2008 | Kruse et al. | |
| 2008/0216055 A1* | 9/2008 | Khatutsky | G06F 11/3409 717/127 |
| 2008/0244047 A1 | 10/2008 | Yeung et al. | |
| 2008/0244600 A1 | 10/2008 | Wong et al. | |
| 2009/0222805 A1 | 9/2009 | Faus et al. | |
| 2009/0248186 A1 | 10/2009 | Hamling | |
| 2009/0265707 A1 | 10/2009 | Goodman et al. | |
| 2010/0031247 A1 | 2/2010 | Arnold et al. | |
| 2010/0050179 A1 | 2/2010 | Mohindra et al. | |
| 2011/0016214 A1* | 1/2011 | Jackson | G06F 9/5044 709/226 |
| 2011/0213884 A1* | 9/2011 | Ferris | G06F 9/50 709/226 |
| 2011/0296019 A1* | 12/2011 | Ferris | G06F 9/45533 709/226 |

FOREIGN PATENT DOCUMENTS

| | | |
|---|---|---|
| EP | 2093964 A1 | 8/2009 |
| WO | WO-9922325 A1 | 5/1999 |
| WO | WO-2008025514 A1 | 3/2008 |

OTHER PUBLICATIONS

John W. Graham, (Issue 3 2001), Web Server Sizing, published by Dell, http://www.dell.com/content/topics/global.aspx/power/en/ps3q01_graham?c=us&l=en&cs=555, retrieved on Mar. 31, 2010, pp. 1-7.

European Patent Office, The Extended European Search Report, May 9, 2014, 7 pages, Munich, Germany.

International Searching Authority, The International Search Report and the Written Opinion, Jan. 28, 2011, 9 Pages.

* cited by examiner

| | Process | Nanny Name | Application | Level Based On | Machine | OFF Mem | OFF CPU | ON Mem | ON CPU | Minimum Mem | Minimum CPU | Small Mem | Small CPU | Large Mem | Large CPU |
|---|---|---|---|---|---|---|---|---|---|---|---|---|---|---|---|
| 1 | Process 1 | mercuryAS | Core | Users | GW | 0 | 0 | 100 | 0.1 | 100 | 0.1 | 100 | 0.1 | 512 | 0.25 |
| 2 | Process 2 | mercuryAS | MetricData | Users | GW | 0 | 0 | 256 | 0.25 | 256 | 0.25 | 256 | 0.25 | 1000 | 1.5 |
| 3 | Process 3 | mercuryAS | OMI | Users | GW | 0 | 0 | 200 | 0.25 | 200 | 0.25 | 200 | 0.25 | 1000 | 1.5 |
| 4 | Process 4 | mercuryAS | Core | Model | DPS | 0 | 0 | 256 | 0.25 | 256 | 0.25 | 256 | 0.25 | 256 | 0.5 |

FIG. 6

| Category | Metrics | Application | OFF | Small | Large |
|---|---|---|---|---|---|
| Users | Logged In Users | Users | 0 | 25 | 150 |
| | Dashboard Users | Users | 0 | 10 | 60 |
| | Defined Users | Users | 0 | 150 | 1000 |
| Scheduled Reports | Per Hour | Users | 0 | 20 | 300 |
| | Total | Users | 0 | 20 | 700 |

FIG. 7

METHODS, APPARATUS, AND ARTICLES OF MANUFACTURE TO DEPLOY SOFTWARE APPLICATIONS

BACKGROUND

Business service management (BSM) is a suite of products for monitoring and measuring information technology services from a business perspective. BSM gives users the ability to collect data (both performance metrics and events) from a wide range of data collectors associated with an Information Technology infrastructure. These data collectors range from collectors that monitor low level hardware performance such as processor usage to higher level collectors that can monitor business transactions that span multiple machines and processes such as order fulfillment. BSM contains a wide variety of ways to analyze and manage the data obtained from monitoring. In addition, implementations of the BSM may contain many applications that range from a dashboard that displays the real-time status of various business processes to an application allowing users to create Service Level Agreements on their business applications or hardware performance.

Implementations of BSM aim to meet the needs of a diverse customer audience. Not all customers want to run the same data collectors or use the same set of applications to analyze and report on their data. In addition, capacity levels can vary as well. For example, one customer may need to monitor the performance of 100 servers and have 10 concurrent users on a BSM system, while another will monitor 10,000 hosts and have 75 concurrent users on the BSM system.

BRIEF DESCRIPTION OF THE DRAWINGS

FIG. 6 illustrates an example table of information that may provide hardware requirement information for software components.

FIG. 7 illustrates an example table of information that may used to determine a capacity level of a software component.

DETAILED DESCRIPTION

Methods, apparatus, and articles of manufacture to deploy software applications are disclosed. In disclosed examples, a deployment management tool receives information from users regarding business needs and desired software for installation. The example deployment management tool determines software components associated with the software applications based on the business needs. In addition, the example deployment management tool determines hardware requirements for each of the software components and adds the hardware requirements to determine a hardware profile for the planned installation of BSM. Based on the hardware profile and available hardware resources, the example deployment tool installs and configures BSM. The deployment tool then monitors the BSM deployment to determine if the operation of the BSM deployment exceeds the configured capacity levels and determine if the hardware requirements for the actual capacity level of the BSM deployment exceeds the available hardware resources of the computer system(s) on which BSM is installed. When the operation of the BSM deployment exceeds the configured capacity level and/or the hardware requirements exceed the hardware resources, the deployment tool provides an alert to the user.

Figure 1:
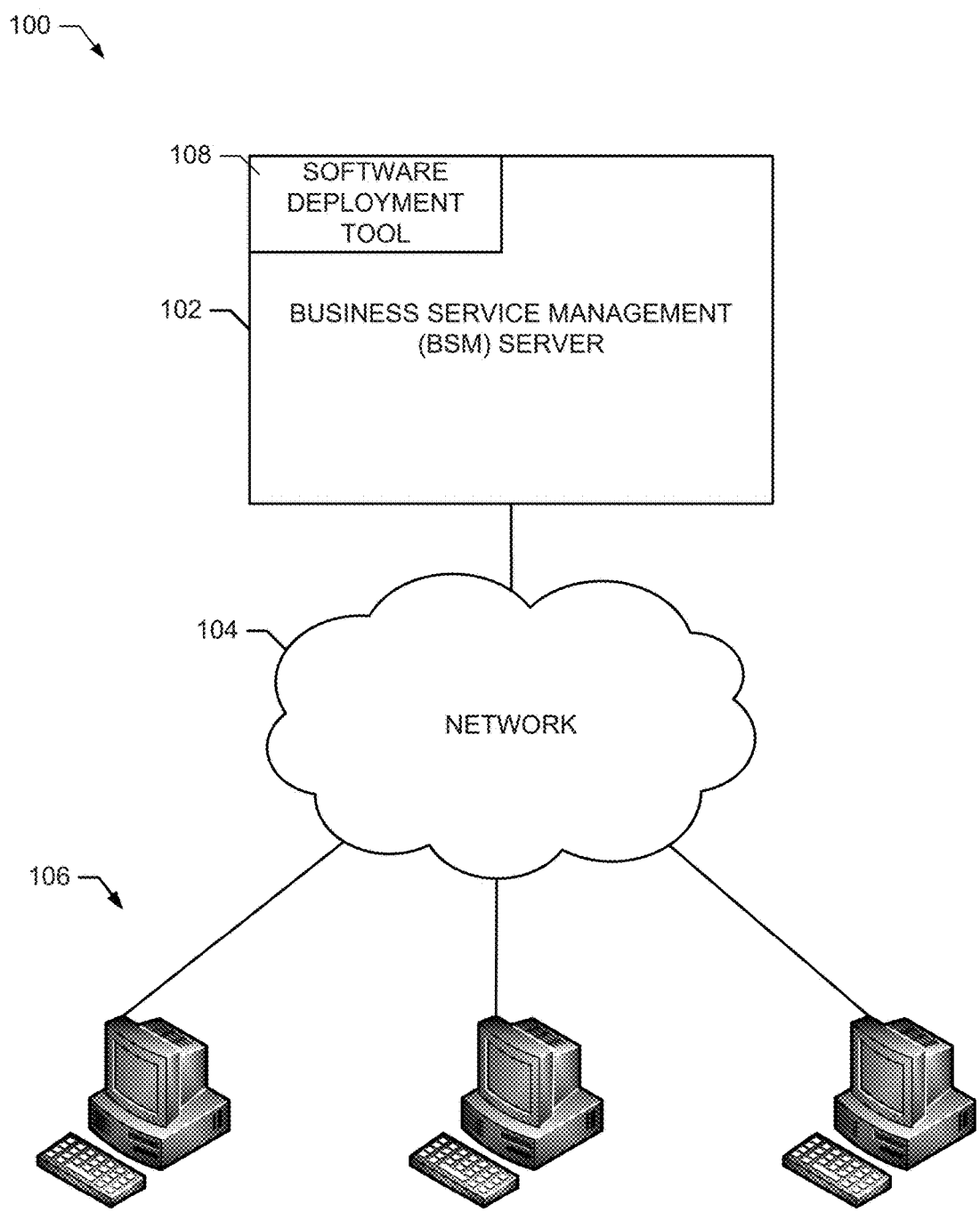
FIG. 1 illustrates an example system that includes a BSM deployment that manages a computer infrastructure that includes one or more computing devices connected to a network.

FIG. 1 illustrates an example system 100 that includes a BSM deployment 102 that manages a computer infrastructure 106 that includes one or more computing devices connected to a network 104. According to the illustrated example, the BSM deployment 102 includes a server deployment tool 108.

The BSM deployment 102 of the illustrated example enables users of the BSM deployment 102 (e.g., system administrators) to monitor and manage the computing devices of the computer infrastructure 106. For example, the BSM deployment 102 may enable monitoring of performance of software applications executing on the computing devices, configure and/or install software applications on the computing devices, monitor the computing devices for hardware or software errors, monitor changes in the computer devices, etc. The example BSM deployment 102 is a software application that is installed on a server computer. Alternatively, the BSM deployment 102 could be implemented by one or more software applications that are installed on one or more computers.

The example BSM deployment 102 includes the server deployment tool 108. The server deployment tool 108 obtains user input regarding the operation of the BSM deployment 102 and installs, configures, and/or tunes the installation of the BSM deployment 102 based on the user input. The server deployment tool 108 may be a standalone system (e.g., a software application) or may operate in conjunction with systems of the BSM deployment 102 (e.g., an installer for the BSM deployment 102). Accordingly, as described in further detail herein, some implementations of the server deployment tool 108 enable a user to customize the deployment of the BSM deployment 102 to fit their needs without the need for the user to provide or determine hardware requirements. For example, the user can specify the set of application components of the BSM deployment 102 that they desire and specify a capacity level reflecting their usage and the server deployment tool will determine a hardware profile for the system and configure the BSM deployment 102 accordingly. The example server deployment tool 108 additionally monitors the BSM deployment 102 during operation to notify users when their usage or configuration exceeds the available hardware resources and/or configuration.

While the examples described herein reference the BSM deployment 102, the methods, apparatus, and articles of manufacture described herein are applicable to other types of systems. For example, the server deployment tool 108 may be used to install, configure, and/or tune any type of software/hardware system. The references to the BSM deployment 102 throughout this patent are intended to be examples and the scope of coverage of this disclosure is not limited to implementations that use and/or include a BSM product.

The network 104 of the illustrated example communicatively couples the one or more computing devices of the computer infrastructure 106 and the BSM deployment 102. The network 104 may be any type of one or more network(s) such as, for example, any combination of a wired network, a wireless network, a local area network, a wide area network, the internet, etc.

The computer infrastructure 106 of the illustrated example includes one or more computing devices. The one or more computing devices may be any type of computing device such as, for example, personal computer(s), server(s), desktop computer(s), laptop computer(s), router(s), switch(es), hub(s), gateway(s), firewall(s), control system(s), mobile computing device(s), etc. For example, the computer infrastructure 106 may be associated with a business and may include any or all of the computing devices of that business. The computing devices of the computer infrastructure 106 may be located at one physical location or may be distributed throughout several physical locations. According to the illustrated example, the BSM deployment 102 monitors, manages, and/or configures the computing devices of the computer infrastructure 106.

While an example system 100 has been illustrated in FIG. 1, one or more of the BSM deployment 102, software deployment tool 108, and/or devices illustrated in FIG. 1 may be combined, divided, re-arranged, omitted, eliminated and/or implemented in any way. Further, the example system 100 may be implemented by hardware, software, firmware and/or any combination of hardware, software and/or firmware. Example hardware includes, but is not limited to, the example processor platform P100, and/or any number and/or type(s) of circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc.

Figure 2:
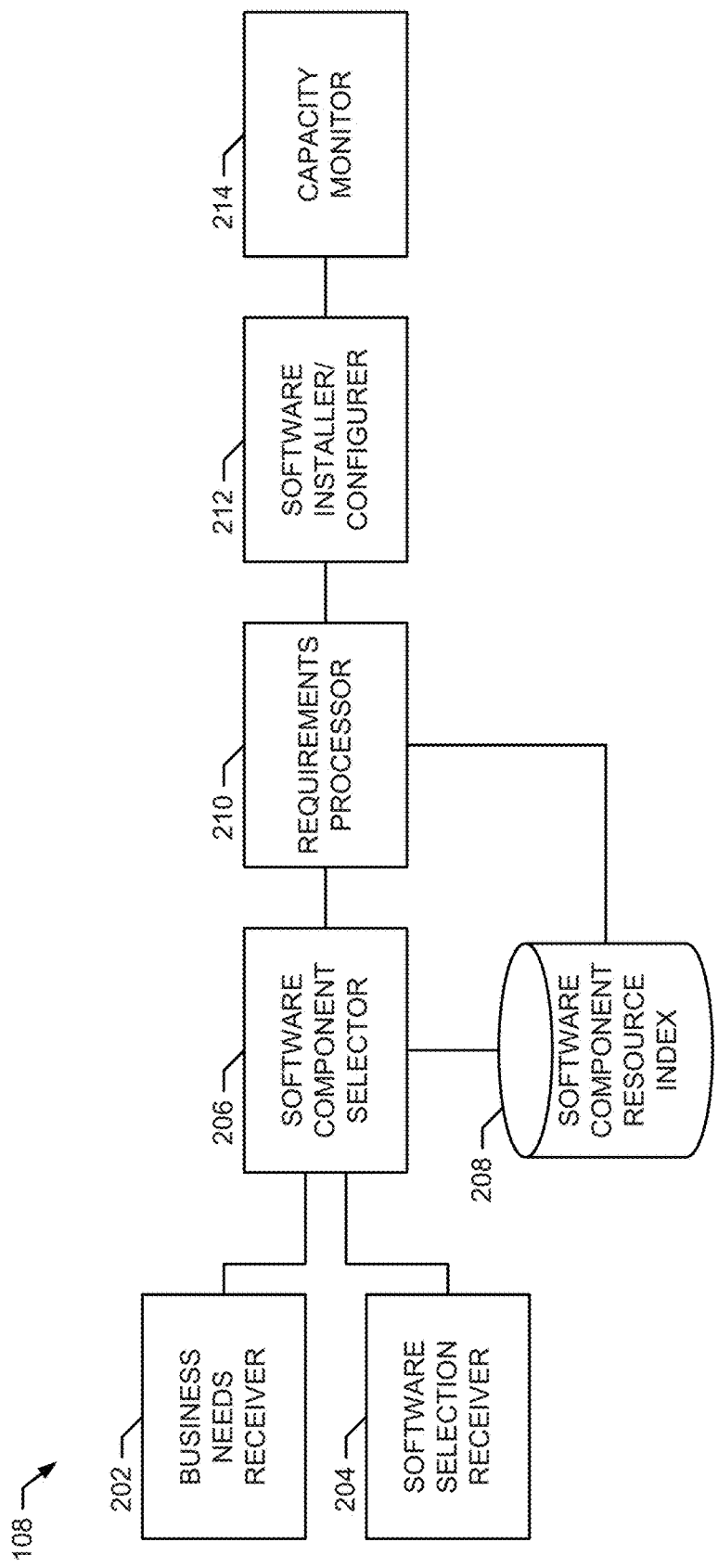
FIG. 2 is a block diagram of an example implementation of the server deployment tool of FIG. 1.

FIG. 2 is a block diagram of an example implementation of the server deployment tool 108 of FIG. 1. The example server deployment tool 108 includes a business needs receiver 202, a software selection receiver 204, a software component selector 206, a software component resource index 208, a requirements processor 210, a software installer/configurer 212, and a capacity monitor 214.

Figure 5:
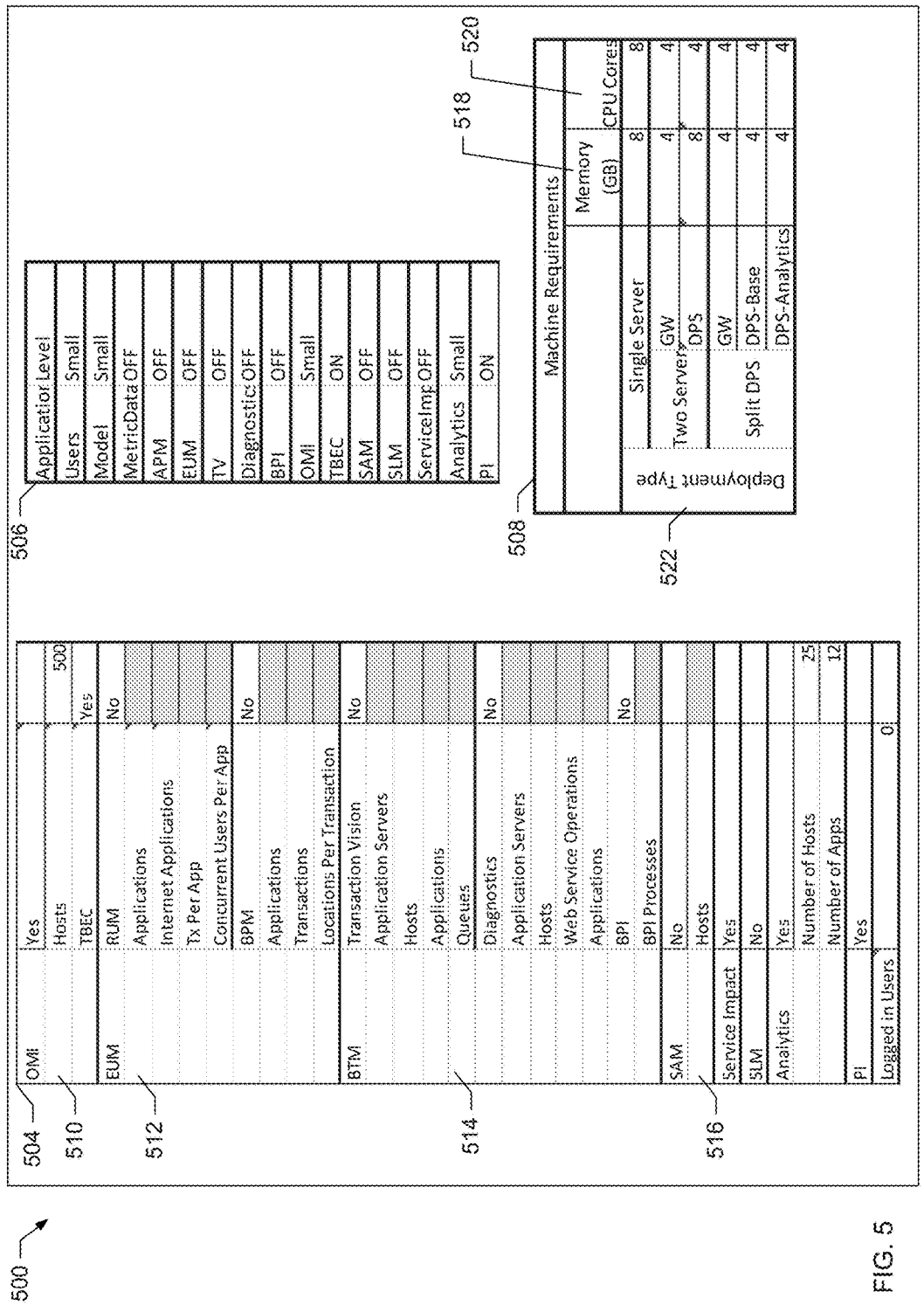
FIG. 5 illustrates an example graphical user interface associated with the example software deployment tool of FIG. 1 that enables a user to input business needs and software selection information and receive information about hardware requirements based on those business needs and software selection information inputs.

The business needs receiver 202 of the illustrated example receives information about the business needs of the implementation of the BSM deployment 102. For example, the business needs receiver 202 may receive the business needs from a user via a user interface, from an input file, etc. The business needs receiver 202 of the illustrated example does not query the user for a computer hardware requirement. For example, FIG. 5 illustrates an example graphical user interface that may be provided to users to receive the business needs information. The business needs received by the business needs receiver 202, may include any type of information about the environment in which the BSM deployment 102 is to operate. For example, the business needs information may include any type of capacity information, such as, for example, the number of users of the BSM deployment 102, the number of computing devices to be monitored by the BSM deployment 102, the number of applications to be monitored by the BSM deployment 102, the number of transactions to be monitored by the BSM deployment 102, the number of users of the computing devices to be monitored by the BSM deployment 102, a number of hosts to be monitored, etc. While the business needs receiver 202 has been described as receiving data associated with business needs, the business needs receiver 202 may receive any type of information associated with the capacity and usage of the BSM deployment 102 such as, for example, the needs of a person, the capacity needed for several businesses, etc. The business needs receiver 202 sends the received information to the software component selector 206.

The software selection receiver 204 of the illustrated example receives information about software selected for inclusion in the BSM deployment 102. For example, the software selection receiver 204 may receive a selection of software applications to be included in the installation of the BSM deployment 102 from a user via a user interface, from an input file, etc. For example, FIG. 5 illustrates an example graphical user interface that may be provided to users to receive the software selection information. The software selection received by the software selection receiver 204 may be any type of information about the software applications to be included. For example, the software selection information may be selections of specific software applications, may be information about features or capabilities of the BSM deployment 102 selected by the user that are interpreted by the software selection receiver 204 to identify software applications needed to provide the features or capabilities, etc. The software selection receiver 204 sends the received information to the software component selector 206.

The software component selector 206 of the illustrated example receives the business needs information from the business needs receiver 202 and the software selection information from the software selection receiver 204 and determines software components to be installed. The example software component selector 206 accesses the software component resource index 208 to determine the components to be installed based on the business needs information and the software selection information. For example, the software component selector 206 may determine a set of components that correspond to a selected software application and then may select among the components based on the identified business needs (e.g., select components that are needed to provide a capacity level specified by the business needs). The software component selector 206 sends the identified components to the requirements processor 210.

The software component resource index 208 may be any type of structured data, flat file, or other data storage that provides information about the available software components. For example, the software component resource index 208 may be implemented by an extensible markup language (XML) file, a spreadsheet, one or more database tables, etc. The example software component resource index 208 stores a list of available software components (e.g., component parts of software applications that can be selectively installed). In addition, the example software component resource index 208 stores an identification of the hardware requirements for utilizing each software component (e.g., memory requirements, processor requirements, storage space requirements, etc.). The software component resource index 208 may store all information in one data storage or may be implemented by multiple data stores.

The requirements processor 210 receives the identified software components and utilizes the information in the software component resource index 208 to determine the hardware requirements for installing and/or executing the identified software components. For example, the requirements processor 210 may analyze each software component to determine the associated hardware requirements and then may combine (e.g., sum or add) the individual hardware requirements to determine a total hardware profile for the identified set of software components. The hardware requirements may be any hardware profiles associated with the software components. For example, the hardware requirements may be threshold hardware capabilities to enable the software components to execute, may be threshold hardware capabilities to enable the software components to be installed, threshold hardware capabilities to enable the software to be executed and used, recommended hardware capabilities for using the software components, etc. The requirements processor 210 sends the identified software components and hardware requirements to the software installer/configurer 212. In addition, the requirements processor 210 may provide the hardware requirements to the user for review. Further, the requirements processor 210 may analyze the hardware resources available for use with the BSM deployment 102 to determine if sufficient hardware resources are available and alert the user if the selected business needs and software selections cannot be configured due to deficiency of the hardware resources. While analysis of hardware requirements are described herein, the requirements processor 210 may analyze any other capabilities associated with the software components such as, for example, operating system requirements, system configuration settings, etc.

The example software installer/configurer 212 receives the identified software components and hardware requirements and installs and/or configures the BSM deployment 102 based on the software components and the hardware requirements. For example, the software installer/configurer 212 may install and/or activate the identified software components, may configure components to run and/or not run based on the identified software components and hardware requirements, may tune the memory usage of the components, etc. The particular processes performed by the software installer/configurer 212 may be based on the particular BSM deployment 102 or other software system that is being installed.

After the software components are installed and/or configured, the example capacity monitor 214 continuously, periodically, aperiodically, and/or upon request compares the operation of the BSM deployment 102 to the configured capacity levels and the current hardware requirements of the BSM deployment 102 to the available hardware resources to determine if the hardware resources are sufficient for the operating capacity level. When the hardware resources are not sufficient, the capacity monitor 214 displays an alert to the user (e.g., the system administrator) and/or adjusts the configuration of the software system to run within the constraints presented by the hardware resources based on the operating capacity level. For example, if the system was implemented based on an expected capacity of 10 users and the capacity monitor 214 determines that 100 users are accessing the system, the capacity monitor 214 may alert the user. In addition, the capacity monitor may determine the hardware requirements for 100 users, may determine that the current available hardware resources are insufficient, and may display an alert requesting the attention of the user. The capacity monitor 214 may run during operation of the BSM deployment 102, during idle time of the BSM deployment 102, and/or at any other time.

While FIG. 2 includes blocks 202-214 separated and coupled in a particular manner, variations are possible. For example, blocks 202-214 may be rearranged. In addition, two or more separate blocks may be combined and implemented by a single component and/or individual blocks may be divided and implemented by several components.

Figure 3:
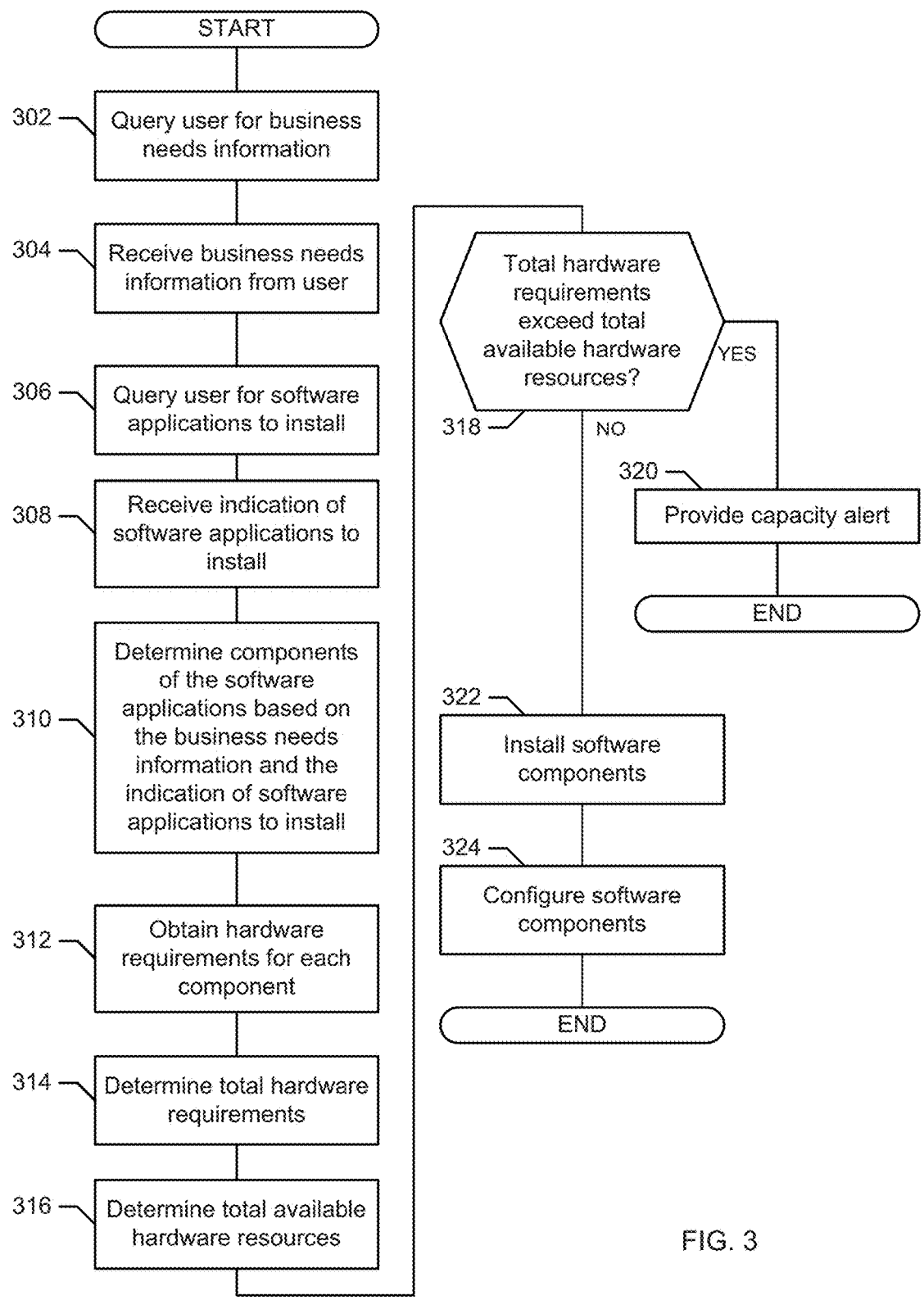
FIG. 3 is a flowchart representative of example machine readable instructions to implement the software deployment tool.
Figure 4:
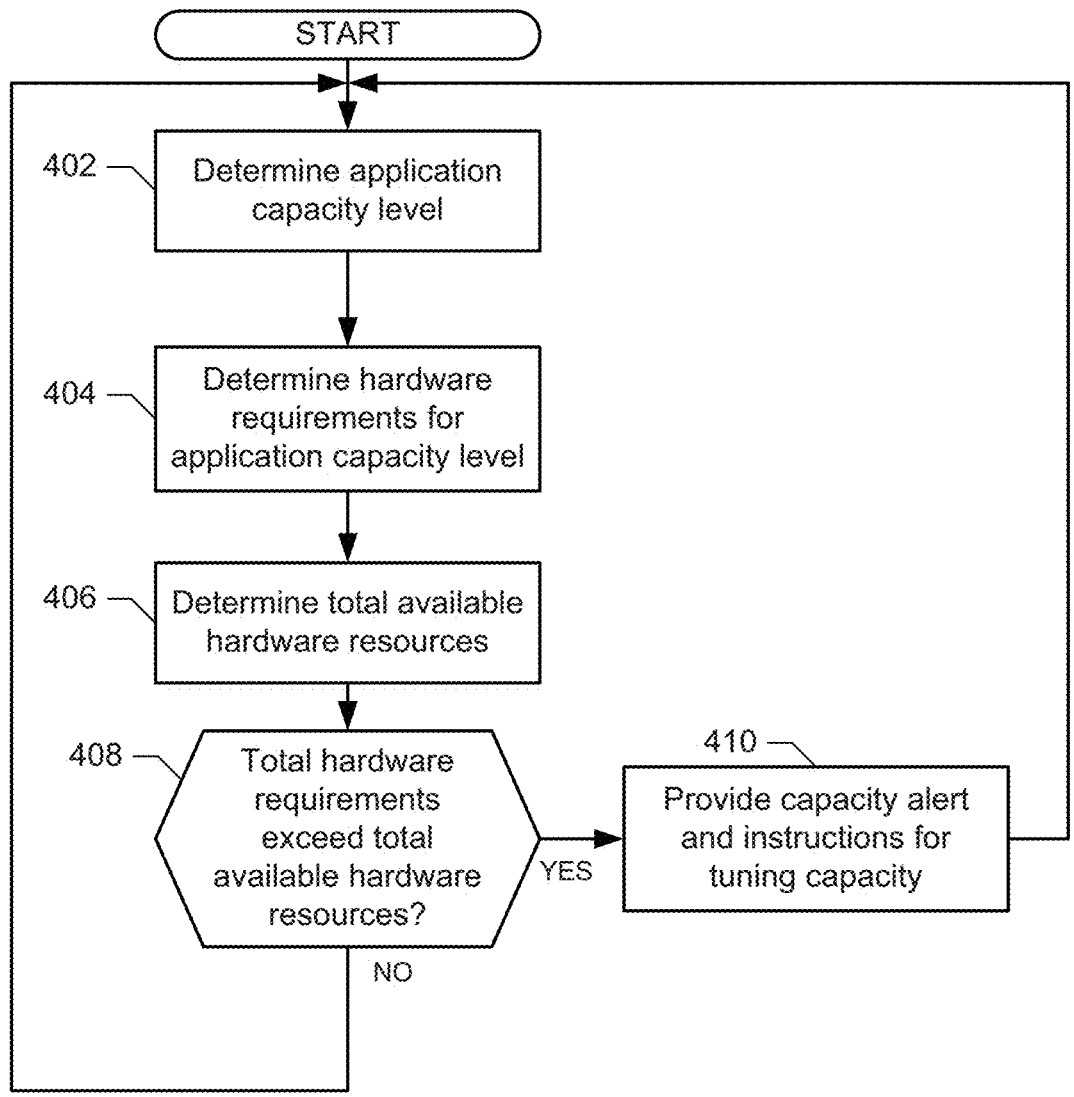
FIG. 4 is a flowchart representative of example machine readable instructions to implement the capacity monitor of FIG. 2.

FIGS. 3-4 depict flow diagrams representative of example processes that may be implemented using, for example, computer readable instructions that may be used to deploy a software application such as the BSM deployment 102. The example processes of FIGS. 3-4 may be performed using a processor, a controller and/or any other suitable processing device. For example, the example processes of FIGS. 3-4 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 3-4 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 3-4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 3-4 may be implemented manually or as any combination(s) of any of the foregoing techniques, for example, any combination of firmware, software, discrete logic and/or hardware. Further, although the example processes of FIGS. 3-4 are described with reference to the flow diagrams of FIGS. 3-4, other methods of implementing the processes of FIGS. 3-4 may be employed. For example, the order of execution of the blocks may be changed, and/or some of the blocks described may be changed, eliminated, sub-divided, or combined. Additionally, any or all of the example processes of FIGS. 3-4 may be performed sequentially and/or in parallel by, for example, separate processing threads, processors, devices, discrete logic, circuits, etc.

FIG. 3 is a flowchart representative of example machine readable instructions to implement the software deployment tool 108. The illustrated example of FIG. 3 begins when the business needs receiver 202 queries a user (e.g., a system administrator) of the software deployment tool 200 for business needs information (block 302). In response, the business needs receiver 202 receives business needs information for the BSM deployment 102 from the user (block 304). In the illustrated example, the software selection receiver 204 then queries the user for one or more software applications to be installed for the BSM deployment 102 (block 306). In response, the software selection receiver 204 receives an indication of the software application(s) to be installed (block 308).

Next, the software component selector 206 determines a set of components of the software applications based on the business needs information and the indication of the software application(s) to install (block 310). Using the determined set of components, the requirements processor 210 determines the hardware requirements for each of the identified components of the software applications and the business needs information (block 312). Then, the requirements processor 210 determines the total hardware requirements for the set of software components (block 314). For example, the requirements processor 210 may sum the requirements for each of the software components to determine a hardware requirements total. Next, the requirements processor 210 determines the total available hardware resources (block 316). For example, the requirements processor 210 may analyze each of the one or more computer systems available for the installation of the BSM deployment 102 to determine the total available hardware resources. The requirements processor determines if the total hardware requirements exceed the total available hardware resources (block 318). When the total hardware requirements exceed the total available hardware resources, the requirements processor 210 provides a capacity alert indicating that the available hardware resources are insufficient for the selected business needs and software selections. The process of FIG. 3 then terminates and/or control loops back to block 302. The user may start over and provide different information for the business need(s) and/or software selection(s) or may obtain additional hardware to meet the requirements.

If the total hardware requirements do not exceed the total available hardware resources (block 318), the software installer/configurer 212 installs the identified software components (block 322). For example, the software installer/configurer 312 may copy the components to the one or more computer systems for use with the BSM deployment 102, may instruct an installer for the BSM deployment 102 to copy components to the one or more computer systems, may inactivate or activate software components based on the identified software components, etc. The software installer/configurer 212 then tunes and/or configures the software components (block 324). For example, the software installer/configurer 212 may configure memory allocation for one or more of the software components. The process of FIG. 3 then terminates and/or control returns to block 302.

FIG. 4 is a flowchart representative of example machine readable instructions to implement the capacity monitor 214 of FIG. 2. The example process begins when the capacity monitor 214 determines an application capacity level (block 402). For example, the capacity monitor 214 may analyze the operation of the BSM deployment 102 to determine the operating capacity (e.g., the number of users of the BSM deployment 102, the number of transactions monitored by the BSM deployment 102, etc.). The capacity monitor then determines hardware requirements for the operating capacity level (block 404). For example, the capacity monitor 214 may analyze the installed software components and use a listing of the associated requirements that is based on capacity (e.g., the software component resource index 208) to determine the hardware requirements for the capacity level. Next, the capacity monitor 214 determines the total available hardware resources for the one or more computers on which the BSM deployment 102 runs (block 406). The capacity monitor determines if the total hardware requirements exceed the total available hardware resources (block 408). When the total hardware requirements do not exceed the total available hardware resources, control returns to block 402 to perform another round of monitoring. When the total hardware requirements exceed the total available hardware resources, the capacity monitor 214 provides a capacity alert and/or instructions for tuning the capacity (block 410). For example, the capacity monitor 214 may indicate that the user needs to increase hardware resources, reduce the capacity level of the BSM deployment 102, and/or remove some of the software components. Control then returns to block 402 to perform another round of monitoring.

While the example process illustrated by FIG. 4 is a loop, any type of implementation may be used. For example, the process of FIG. 4 may execute once after being triggered by, for example, a fuse that detects that the capacity level exceeds the load the system can maintain. In another implementation, the process of FIG. 4 could be schedule to execute at particular times based on a schedule.

FIG. 5 illustrates an example graphical user interface 500 associated with the example software deployment tool 108 of FIG. 1 that enables a user to input business needs and software selection information and receive information about hardware requirements based on those business needs and software selection information inputs. The example graphical user interface 500 includes a user input section 504, a software component information section 506, and a hardware requirements section 508.

The user input section 504 of the illustrated example provides several fields in which the user (e.g., a system administrator) can input business needs information and software selection information. For example, the user input section 504 enables a user to input a number of hosts for an operations manager (OMI) 510, a number of applications to be monitored by an end user management system (EUM) 512, a number of queues to be monitored by a business transaction management system (BTM), a number of hosts for a system availability management system (SAM) 516, whether particular software components should be enabled or disabled, etc. While the example user input section 504 provides a table for user input, any type of user input element may be used such as, for example, several pages of fields, drop down boxes, checkboxes, radio buttons, text fields, etc. In addition, any type of business needs information or other information associated with the capacity of the software to be deployed by the software deployment tool 108, may be included. In the illustrated example, the user inputs are processed as they are input by the user. However, any other type of trigger may cause processing of the data such as, for example, a submit button, a determination that all fields have been completed, etc. The data input into the user input section 504 is used by the software deployment tool 108 to determine the capacity level and, thereby, the software installation and configuration for the software to be deployed by the software deployment tool 108.

The software component information section 506 indicates information about software components to be installed and there capacity levels based on the business needs information from the user. For example, the software component information section 506 may include a field for each software component that is a part of the software to be deployed by the software deployment tool 108. In the illustrated example, the fields for each software component indicate whether or not the software component will be installed based on the business needs information and software selection information provided from the user. In addition, the example software component information section 506 indicates a capacity level for software components. For example, the software component information section 506 may indicate a capacity level of small, medium, large, extra large, etc. Alternatively, the capacity level could be any other indication of the capacity of the software to be deployed by the software deployment tool 108 (e.g., the capacity to monitor computing devices and/or users).

The hardware requirements section 508 displays an indication of the hardware requirements calculated for the software components identified in the software component information section based on the business needs identified in the user input section 504. The example hardware requirements section 508 includes memory requirements in gigabytes (GB) 518 and processor requirements in number of needed CPU cores 520. The example hardware requirements section 508 provides hardware requirements for several different system deployment types 522 such as a single server implementation, two server implementations, etc. The hardware requirements section 508 provides a user with information to understand the hardware needed to deploy the particular software system.

The software component information section 506 and/or the hardware requirements section 508 may be used by the software deployment tool 108 when deploying the software system. For example, the software components may be configured by the software installer/configurer 212 as shown in the software component information section 506. The requirements processor 210 may determine if the available hardware resources are sufficient to meet the hardware requirements identified in the hardware requirements section 508. The data identified in the software component information section 506 and/or the hardware requirements section 508 may be transferred by the user from the graphical user interface 500 to the software deployment tool 108, may be an interface displaying data of the software deployment tool 108, etc.

While the graphical user interface 500 includes the user input section 504, the software component information section 506, and the hardware requirements section 508 on a single user interface, the sections may alternatively be provided on separate user interfaces. The graphical user interface 500 may be integrated with any other available interface. Additionally, any of the sections may be implemented using any type of user interface components and/or may be implemented by output to a file.

FIG. 6 illustrates an example table of information 602 that may provide hardware requirement information for software components. The example table of information 602 may be stored in the software component resource index 208 and may be accessed by the software component selector 206 and/or the requirements processor 210. The example table of information 602 includes a column identifying a process or software component 606, a column identifying the name of a monitoring application 608, a column of the name of a software application 610, an indication of what parameter a capacity level is based on 612, a column identifying a computing device on which the software application and/or process is operating 614, column(s) identifying hardware needed when the process or software component is deactivated 616, column(s) identifying hardware needed when the process or software component is activated 618, column(s) identifying a minimum hardware requirement for the process or software component 620, column(s) identifying hardware requirements when the process or software component is set to a small capacity level 622, and column(s) identifying hardware needed when the process or software component is set to a large capacity level 624. Additional columns or configurations may be used in other implementations. The example table of information 602 may be used as a lookup table when determining the hardware requirements corresponding to the software components to be deployed by the software deployment tool 108.

FIG. 7 illustrates an example table of information 702 that may be used to determine a capacity level of a software component. The example table of information 702 provides information that may be used by the software deployment tool 108 to determine the appropriate capacity level for software components based on the business need(s) identified by users. The example table of information 702 includes a column identifying a category of business need(s) 708, a column of metric(s) that may be input by a user 710, a column identifying the corresponding software application 712, a column identifying a capacity parameter for the metric corresponding to a deactivation of the software application 714, a column identifying a capacity parameter for the metric corresponding to a small capacity level for the software application 716, and a column identifying a capacity parameter for the metric corresponding to a large capacity level for the software application 716.

Figure 8:
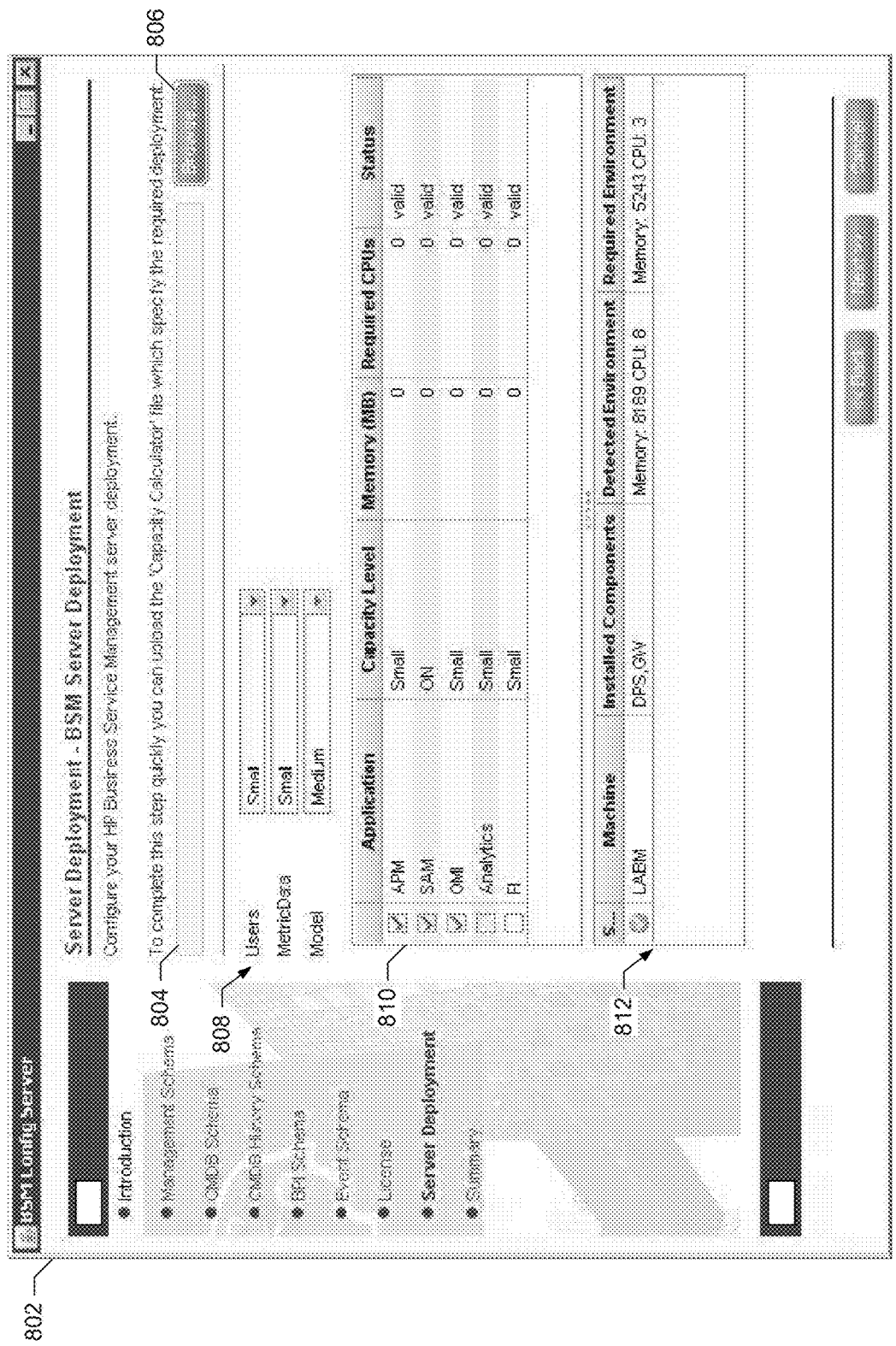
FIG. 8 illustrates an example graphical user that may be used to configure and/or deploy the BSM deployment of FIG. 1.

FIG. 8 illustrates an example graphical user interface 802 that may be used to configure and/or deploy the BSM deployment 102 of FIG. 1. The example graphical user interface 802 includes a file input user interface element 804 to enable a user to input a hardware and software profile such as, for example, the hardware and software profile identified by the graphical user interface 500 may be stored in a file and input using the file input user interface element 804. The graphical user interface 802 additionally includes metric capacity level user interface elements 808 that enable a user to adjust the capacity level(s) for metric(s). The graphical user interface 802 also includes an indication of the software component(s) to be activated and the associated capacity level(s) 810. Further, the graphical user interface 802 includes an indication of the computing device(s) (machine(s)) on which the software system is to be deployed by the software deployment tool 108, which includes the associated hardware resources of the computing devices.

Figure 9:
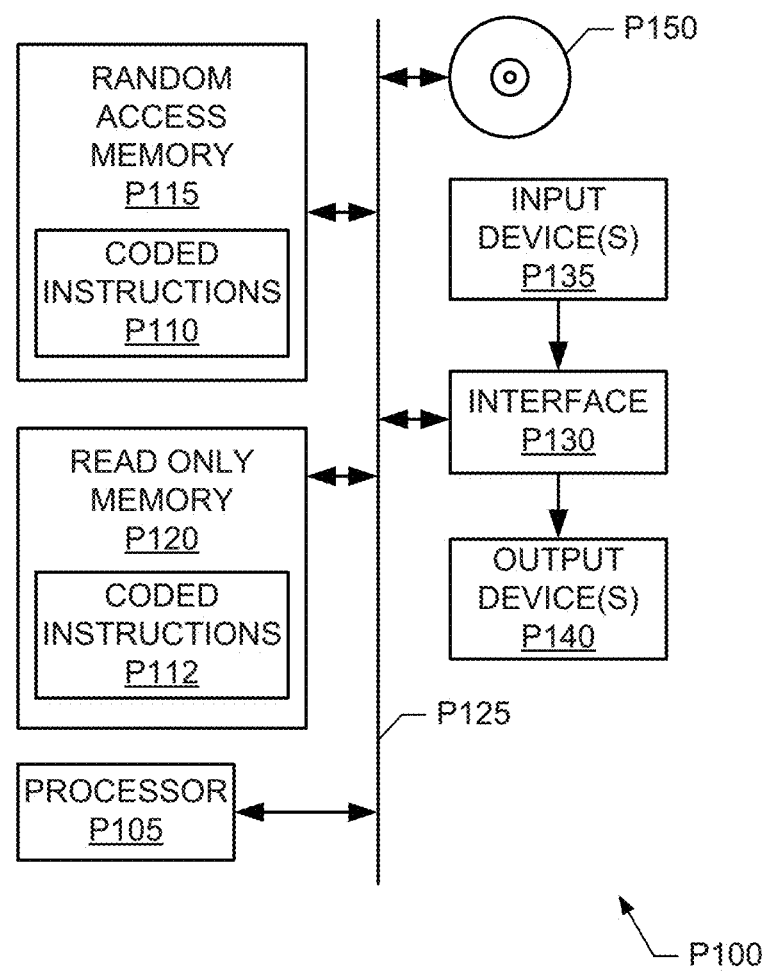
FIG. 9 is a schematic illustration of an example processor platform that may be used and/or programmed to execute the example interactions, the example processes and/or the example machine-accessible instructions of FIGS. 3-4 to implement any or all of the example methods, apparatus and/or articles of manufacture described herein.

FIG. 9 is a schematic diagram of an example processor platform P100 that may be used and/or programmed to execute the interactions and/or the example machine readable instructions of FIGS. 3-4 to implement software deployment tool 108 of FIG. 1 and/or the business needs receiver 202, the software selection receiver 204, the software component selector 206, the requirements processor 210, the software installer/configurer 212, and/or the capacity monitor 214 of FIG. 2. One or more general-purpose processors, processor cores, microcontrollers, etc may be used to implement the processor platform P100.

The processor platform P100 of FIG. 9 includes at least one programmable processor P105. The processor P105 may implement, for example, the BSM deployment 102, the software deployment tool 108, the business needs receiver 202, the software selection receiver 204, the software component selector 206, the requirements processor 210, the software installer/configurer 212, and/or the capacity monitor 214. The processor P105 executes coded instructions P110 and/or P112 present in main memory (i.e., a computer readable storage medium) of the processor P105 (e.g., within a RAM P115 and/or a ROM P120) and/or stored in the tangible computer-readable storage medium P150. The processor P105 may be any type of processing unit, such as a processor core, a processor and/or a microcontroller. The processor P105 may execute, among other things, the example interactions and/or the example machine-accessible instructions of FIGS. 3-4 to deploy the BSM deployment 102, as described herein. Thus, the coded instructions P110, P112 may include the instructions of FIGS. 3-4.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. The tangible computer-readable memory P150 may be any type of tangible computer-readable medium such as, for example, compact disk (CD), a CD-ROM, a floppy disk, a hard drive, a digital versatile disk (DVD), and/or a memory associated with the processor P105. Access to the memory P115, the memory P120, and/or the tangible computer-medium P150 may be controlled by a memory controller.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130.

Although certain example methods, apparatus and articles of manufacture have been described herein, the scope of coverage of this disclosure is not limited thereto. On the contrary, this patent covers all methods, apparatus and articles of manufacture fairly falling within the scope of the claims of this patent either literally or under the doctrine of equivalents.

What is claimed is:

1. A non-transitory computer readable medium comprising computer readable instructions that, when executed, cause a computer to at least:
   determine a set of software components for execution on a computer system based on a request from a user, the request indicating business needs to be provided by the computer system for an expected number of users;
   determine an expected operating capacity of the computer system to execute the software components based on the expected number of users;
   configure the computer system to execute the set of software components on the computer system when it is determined that hardware resources of the computer system available to execute the set of software components are sufficient to meet the expected operating capacity for the expected number of users;
   monitor an operating capacity level of the computer system, the operating capacity level being based on an actual number of users accessing the set of software components on the computer system;
   compare an amount of required hardware resources needed to support the operating capacity level to a threshold amount of available hardware resources of the computer system; and
   if the amount of required hardware resources exceeds the threshold amount of available hardware resources, generate an alert to indicate the available hardware resources are insufficient to support the operating capacity level and provide instructions to tune the operating capacity level.

2. The non-transitory computer readable medium of claim 1, wherein the instructions, when executed, further cause the computer to:
   before the set of software components are installed on the computer system, determine whether the amount of available hardware resources is sufficient to support installation and execution of the software components; and
   if the amount of available hardware resources is sufficient, install the software components.

3. The non-transitory computer readable medium of claim 1, wherein the instructions, when executed, further cause the computer to determine the amount of required hardware resources based on the operating capacity level and the software components.

4. The non-transitory computer readable medium of claim 3, wherein the amount of required hardware resources is determined by determining an amount of hardware resources needed for each software component of the set of software components and summing the hardware resources required for each software component.

5. A method executed by a computer, comprising:
   determining a set of software components for execution on a computer system based on a request from a user, the request indicating business needs to be provided by the computer system for an expected number of users;
   determining an expected operating capacity of the computer system to execute the software components based on the expected number of users;
   configuring the computer system to execute the set of software components on the computer system when it is determined that hardware resources of the computer system available to execute the set of software components are sufficient to meet the expected operating capacity for the expected number of users;
   monitoring an operating capacity level of the computer system, the operating capacity level being based on an actual number of users accessing the set of software components on the computer system;
   comparing an amount of required hardware resources needed to support the operating capacity level to a threshold amount of available hardware resources of the computer system; and
   if the amount of required hardware resources exceeds the threshold amount of available hardware resources, generating an alert to indicate the available hardware resources are insufficient to support the operating capacity level and provide instructions to tune the operating capacity level.

6. The method of claim 5, wherein the comparing comprises accessing a listing of hardware requirements associated with each of the set of software components.

7. The method of claim 6, further comprising determining a total amount of available hardware resources for a set of computers included in the computer system.

8. An apparatus comprising:
   a processor; and
   a non-transitory storage medium storing instructions executable on the processor to:
      determine a set of software components for execution on a computer system based on a request from a user, the request indicating business needs to be provided by the computer system for an expected number of users;
      determine an expected operating capacity of the computer system to execute the software components based on the expected number of users;
      configure the computer system to execute the set of software components on the computer system when it is determined that hardware resources of the computer system available to execute the set of software components are sufficient to meet the expected operating capacity for the expected number of users;

monitor an operating capacity level of the computer system, the operating capacity level being based on an actual number of users accessing the set of software components on the computer system;

compare an amount of required hardware resources needed to support the operating capacity level to a threshold amount of available hardware resources of the computer system; and if the amount of required hardware resources exceeds the threshold amount of available hardware resources, generate an alert to indicate the available hardware resources are insufficient to support the operating capacity level and provide instructions to tune the operating capacity level.

9. The apparatus of claim 8, wherein the expected operating capacity is further indicative of at least one of an expected number of computing devices included in the computer system or an expected number of computing transactions to be monitored.

* * * * *